(12) United States Patent
Quinn et al.

(10) Patent No.: US 12,034,813 B2
(45) Date of Patent: *Jul. 9, 2024

(54) POLICY-BASED CONNECTION PROVISIONING USING DOMAIN NAME SYSTEM (DNS) REQUESTS

(71) Applicant: Cisco Technology, Inc., San Jose, CA (US)

(72) Inventors: Paul Quinn, Wellesley, MA (US); Kyle Andrew Donald Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,435

(22) Filed: Mar. 21, 2023

(65) Prior Publication Data

US 2023/0262132 A1    Aug. 17, 2023

Related U.S. Application Data

(63) Continuation of application No. 17/826,003, filed on May 26, 2022, now Pat. No. 11,632,431, which is a (Continued)

(51) Int. Cl.
*H04L 61/4511* (2022.01)
*H04L 41/0894* (2022.01)
(Continued)

(52) U.S. Cl.
CPC ........ *H04L 67/141* (2013.01); *H04L 41/0894* (2022.05); *H04L 41/5058* (2013.01); *H04L 61/4511* (2022.05); *H04L 2101/668* (2022.05)

(58) Field of Classification Search
CPC .............. H04L 67/1002; H04L 67/141; H04L 61/1511; H04L 65/1069; H04L 47/125; G06F 9/5083; H04W 28/08
See application file for complete search history.

(56) References Cited

U.S. PATENT DOCUMENTS 7,734,822 B2    6/2010  Poeluev
8,107,483 B2    1/2012  Dunk
(Continued)

OTHER PUBLICATIONS

Licht, Robert, et al., "Client ID in Forwarded DNS Queries," Mar. 14, 2017, Charter Communications and Akamai Technologies, 9 pages.

(Continued)

*Primary Examiner* — Kostas J Katsikis
(74) *Attorney, Agent, or Firm* — Lee & Hayes P.C.

(57) ABSTRACT

Techniques for policy-based connection provisioning using Domain Name System (DNS) requests are described herein. The techniques may include receiving policy data associated with one or more headend nodes that manage connections to computing resources. Additionally, the techniques may include receiving a DNS request from a client device to establish a connection between the client device and a first headend node of the one or more headend nodes. The DNS request may include an attribute associated with the client device. A provisioning service may determine that the connection should be established between the client device and the first headend node based at least in part on evaluating the attribute with respect to the policy data. Additionally, the techniques may include sending an internet protocol (IP) address, which is associated with the first headend node, to the client device to facilitate establishment of the connection.

20 Claims, 7 Drawing Sheets

Related U.S. Application Data continuation of application No. 16/917,152, filed on Jun. 30, 2020, now Pat. No. 11,349,932.

(51) Int. Cl.
*H04L 41/50* (2022.01)
*H04L 67/141* (2022.01)
*H04L 101/668* (2022.01)

(56) References Cited

U.S. PATENT DOCUMENTS

| | | | |
|---|---|---|---|
| 8,401,028 | B2 | 3/2013 | Mihaly et al. |
| 9,319,300 | B2 | 4/2016 | Huynh Van |
| 10,182,096 | B1 | 1/2019 | Siddiqi et al. |
| 10,454,879 | B2 | 10/2019 | Chan et al. |
| 10,701,582 | B2 | 6/2020 | Henry et al. |
| 11,075,970 | B2 * | 7/2021 | Gordon ............ H04L 69/40 |
| 2007/0118669 | A1 | 5/2007 | Rand et al. |
| 2010/0057895 | A1 * | 3/2010 | Huang ............ H04L 63/1483 |
| | | | 709/222 |
| 2012/0197792 | A1 | 8/2012 | Raleigh |
| 2014/0317312 | A1 * | 10/2014 | Mitchell ............ H04L 12/4633 |
| | | | 709/244 |
| 2016/0006624 | A1 | 1/2016 | Martini |
| 2017/0331859 | A1 * | 11/2017 | Bansal ............ H04L 63/029 |
| 2018/0302375 | A1 | 10/2018 | Els |
| 2018/0309658 | A1 * | 10/2018 | Parla ............ H04L 45/54 |
| 2019/0081958 | A1 | 3/2019 | Lee |
| 2019/0089747 | A1 | 3/2019 | Wang et al. |
| 2019/0124010 | A1 | 4/2019 | Murgia |
| 2019/0141015 | A1 * | 5/2019 | Nellen ............ H04L 63/0272 |
| 2019/0342266 | A1 | 11/2019 | Ramachandran et al. |
| 2020/0067935 | A1 * | 2/2020 | Carnes, III ............ H04L 63/101 |
| 2020/0120032 | A1 | 4/2020 | Bohra et al. |
| 2020/0204469 | A1 | 6/2020 | Filsfils et al. |
| 2020/0228618 | A1 | 7/2020 | Wu et al. |
| 2020/0322264 | A1 | 10/2020 | Clad et al. |
| 2020/0336465 | A1 | 10/2020 | Mestery |
| 2020/0349569 | A1 | 11/2020 | Murao |
| 2020/0389393 | A1 | 12/2020 | Bosch et al. |
| 2021/0111991 | A1 | 4/2021 | Vadera |
| 2021/0136040 | A1 | 5/2021 | Mestery et al. |
| 2021/0409496 | A1 | 12/2021 | Quinn et al. |
| 2022/0286515 | A1 | 9/2022 | Quinn et al. |

OTHER PUBLICATIONS

W. van der Gaast, "Client Subnet in DNS Queries," Google, May 20, 2016 (retrieved on May 20, 2016), pp. 1-30.

Mak-Suzuki, et al., KDDI Corporation, "MEC003 Enhanced DNS Support for Distributed MEC Environment," ETSI, submission dated Jan. 31, 2019, 9 pages.

Office Action for U.S. Appl. No. 16/917,152, dated May 10, 2021, Quinn, "Policy-Based Connection Provisioning using Domain Name System (DNS) Requests", pp. 14.

Office Action for U.S. Appl. No. 16/917,152, dated Oct. 6, 2021, Quinn, "Policy-Based Connection Provisioning using Domain Name System (DNS) Requests", 18 pages.

Pan J et al: 11 An overview of DNS-based server selections in content distribution networks, Computer Networks, Elsevier, Amsterdam, NL, vol. 43. No. 6. Dec. 20, 2003 (Dec. 20, 2003), pp. 695-711, XP004470525, ISSN: 1389-1286, DOI: 10.1016/S1389-1286(03)00293-7 the whole document.

The International Search Report and Written Opinion for PCT Application No. PCT/US21/37556, dated Oct. 1, 2021.

Office Action for Indian Application No. 202227077034, dated Jan. 19, 2024, 6 Pages.

\* cited by examiner

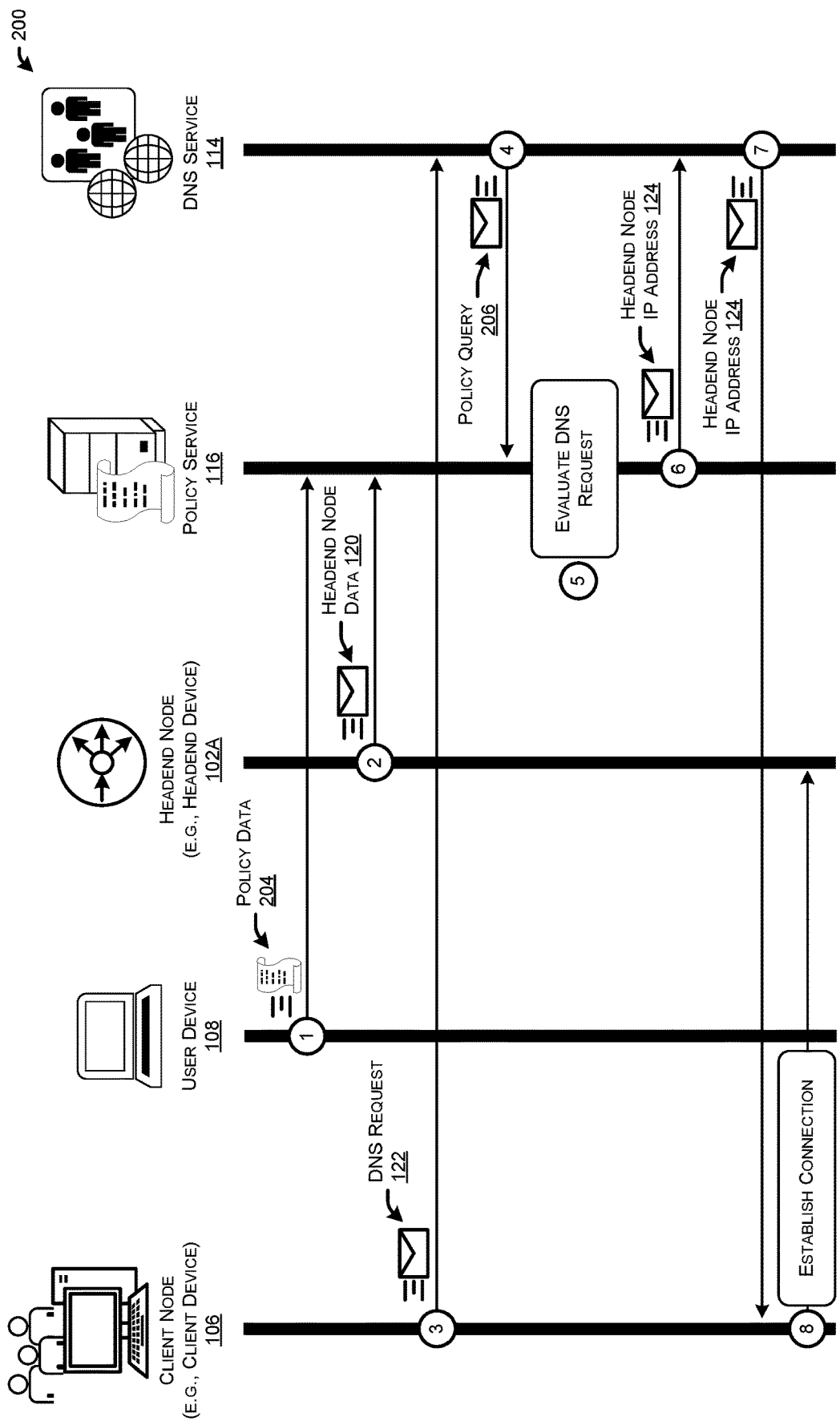

400 ⟶

```
┌─────────────────────────────────────────────────────────────────┐
│ RECEIVE FIRST POLICY DATA ASSOCIATED WITH A FIRST HEADEND DEVICE │
│ THAT MANAGES ONE OR MORE FIRST CONNECTIONS TO FIRST COMPUTING    │
│                         RESOURCES                                │
│                            402                                   │
└─────────────────────────────────────────────────────────────────┘
                                │
                                ▼
┌─────────────────────────────────────────────────────────────────┐
│ RECEIVE SECOND POLICY DATA ASSOCIATED WITH A SECOND HEADEND      │
│ DEVICE THAT MANAGES ONE OR MORE SECOND CONNECTIONS TO SECOND     │
│                    COMPUTING RESOURCES                           │
│                            404                                   │
└─────────────────────────────────────────────────────────────────┘
                                │
                                ▼
┌─────────────────────────────────────────────────────────────────┐
│ RECEIVE A DOMAIN NAME SYSTEM (DNS) REQUEST TO ESTABLISH A        │
│ COMMUNICATION CONNECTION BETWEEN A CLIENT DEVICE AND AT LEAST    │
│ ONE OF THE FIRST HEADEND DEVICE OR THE SECOND HEADEND DEVICE,    │
│ THE DNS REQUEST INCLUDING AN ATTRIBUTE ASSOCIATED WITH THE       │
│                       CLIENT DEVICE                              │
│                            406                                   │
└─────────────────────────────────────────────────────────────────┘
                                │
                                ▼
┌─────────────────────────────────────────────────────────────────┐
│ EVALUATE THE ATTRIBUTE WITH RESPECT TO AT LEAST ONE OF THE FIRST │
│           POLICY DATA OR THE SECOND POLICY DATA                  │
│                            408                                   │
└─────────────────────────────────────────────────────────────────┘
                                │
                                ▼
┌─────────────────────────────────────────────────────────────────┐
│ DETERMINE THAT THE COMMUNICATION CONNECTION IS TO BE ESTABLISHED │
│                WITH THE FIRST HEADEND DEVICE                     │
│                            410                                   │
└─────────────────────────────────────────────────────────────────┘
                                │
                                ▼
┌─────────────────────────────────────────────────────────────────┐
│ SEND, TO THE CLIENT DEVICE, AN INTERNET PROTOCOL (IP) ADDRESS    │
│ THAT IS ASSOCIATED WITH THE FIRST HEADEND DEVICE TO FACILITATE   │
│         ESTABLISHMENT OF THE COMMUNICATION CONNECTION            │
│                            412                                   │
└─────────────────────────────────────────────────────────────────┘
```

```
┌─────────────────────────────────────────────────────────────┐
│  RECEIVE, AT A POLICY SERVICE, POLICY DATA ASSOCIATED WITH  │
│  ONE OR MORE HEADEND NODES, THE ONE OR MORE HEADEND NODES   │
│  INCLUDING A FIRST HEADEND NODE THAT MANAGES A FIRST        │
│  CONNECTION TO A FIRST COMPUTING RESOURCE                   │
│                           502                               │
└─────────────────────────────────────────────────────────────┘
                              │
                              ▼
┌─────────────────────────────────────────────────────────────┐
│  RECEIVE A POLICY QUERY FROM A DOMAIN NAME SERVICE (DNS)    │
│  SERVICE, THE POLICY QUERY INCLUDING AT LEAST A DNS REQUEST │
│  AND AN ATTRIBUTE ASSOCIATED WITH A CLIENT NODE THAT        │
│  GENERATED THE DNS REQUEST                                  │
│                           504                               │
└─────────────────────────────────────────────────────────────┘
                              │
                              ▼
┌─────────────────────────────────────────────────────────────┐
│  DETERMINE, BASED AT LEAST IN PART ON THE POLICY DATA AND   │
│  BASED AT LEAST IN PART ON THE ATTRIBUTE, THAT A SECOND     │
│  CONNECTION IS TO BE ESTABLISHED BETWEEN THE CLIENT NODE    │
│  AND THE FIRST HEADEND NODE TO PROVIDE THE CLIENT NODE WITH │
│  ACCESS TO THE FIRST COMPUTING RESOURCE                     │
│                           506                               │
└─────────────────────────────────────────────────────────────┘
                              │
                              ▼
┌─────────────────────────────────────────────────────────────┐
│  SEND, TO THE DNS SERVICE, AN INTERNET PROTOCOL (IP)        │
│  ADDRESS THAT CORRESPONDS TO THE FIRST HEADEND NODE TO      │
│  FACILITATE ESTABLISHMENT OF THE SECOND CONNECTION          │
│                           508                               │
└─────────────────────────────────────────────────────────────┘
```

FIG. 5

POLICY-BASED CONNECTION PROVISIONING USING DOMAIN NAME SYSTEM (DNS) REQUESTS

CROSS-REFERENCE TO RELATED APPLICATION

This patent application is a continuation of and claims priority to U.S. patent application Ser. No. 17/826,003, filed May 26, 2022, which is a continuation of and claims priority to U.S. patent application Ser. No. 16/917,152, filed Jun. 30, 2020, now U.S. Pat. No. 11,349,932, issued May 31, 2022, which are fully incorporated herein by reference.

TECHNICAL FIELD

The present disclosure relates generally to policy-based connection provisioning for connecting devices to headend devices at least partly using Domain Name System (DNS) requests.

BACKGROUND

A virtual private network (VPN) extends a private network across a public network, such as the internet, and enables end users to send and receive data across the public network as if their computing devices were directly connected to the private network. In cloud computing environments, however, where cloud-based resources are hosting a plurality of private networks for different clients, VPN and similar technologies often require the establishment of a very high number of connections to cloud tunnel endpoints. Traditionally, when a VPN client attempts to connect to a tunnel headend, the VPN client only needs to know a basic DNS name, for example, "vpn.company.com." However, this simple lookup is no longer sufficient as the VPN headend belongs to the cloud service provider. As such, deciding where to establish connectivity for the client requires additional criteria to be evaluated, and the selection of a specific tunnel endpoint should be transparent to the end user but subject to the defined policy by the customer administrator and the constraints of the cloud service.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A and 2B illustrate data flow diagrams of example processes for policy-based connection provisioning using DNS requests.

FIG. 4 illustrates a flow diagram of an example method for providing a policy-based connection using a DNS request.

FIG. 5 illustrates a flow diagram of another example method for providing a policy-based connection using a DNS request.

DESCRIPTION OF EXAMPLE EMBODIMENTS

Overview

Figure 1:
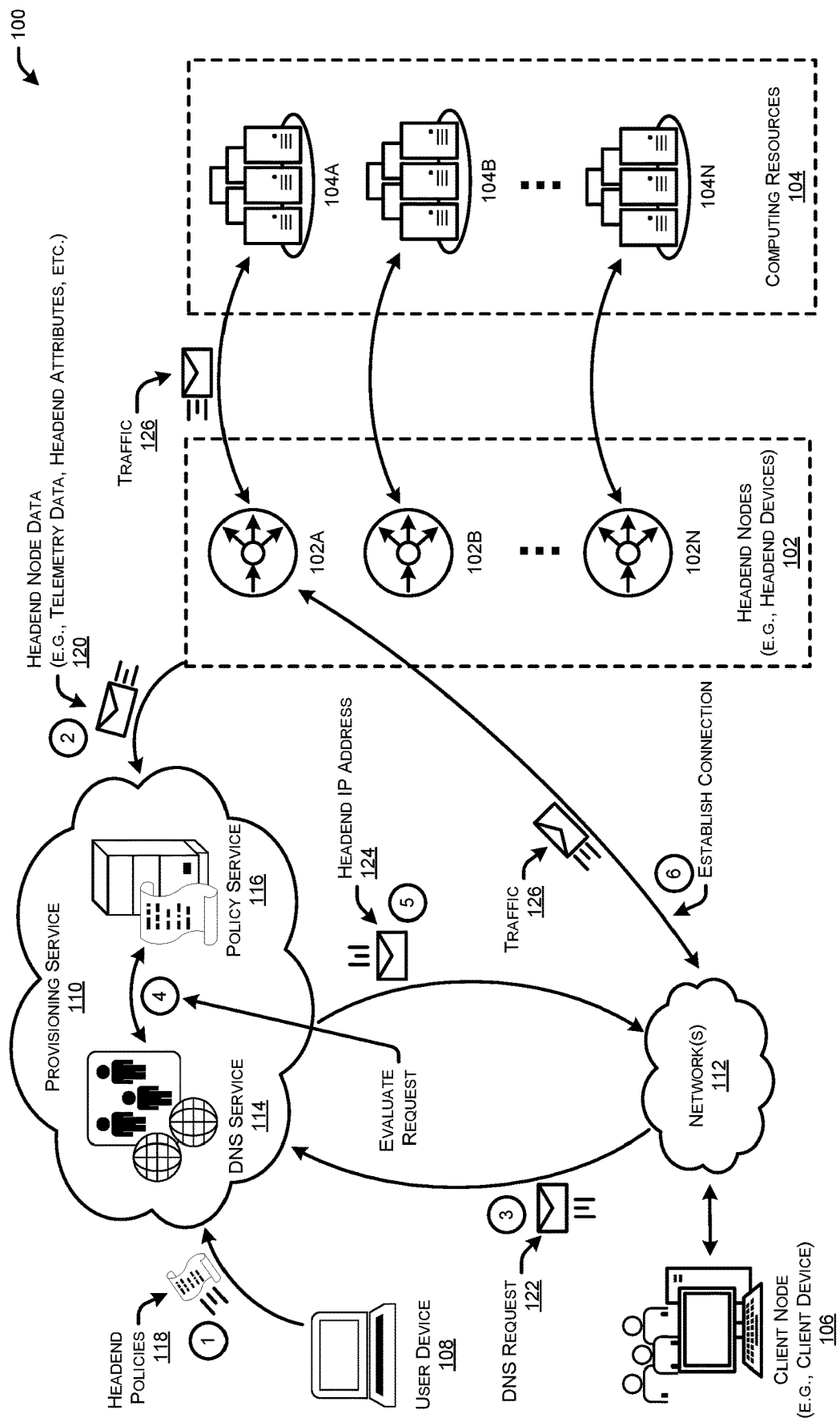
FIG. 1 illustrates a system-architecture diagram of an example environment for policy-based connection provisioning using DNS requests.

This disclosure describes techniques for providing policy-based connections to computing resources using Domain Name System (DNS) requests. For instance, some of the techniques described in this disclosure may include receiving first policy data associated with a first headend device that manages one or more first connections to first computing resources and receiving second policy data associated with a second headend device that manages one or more second connections to second computing resources. Additionally, a domain name system (DNS) request may be received from a client device that indicates a desire to establish a communication connection with at least one of the first headend device or the second headend device. The DNS request may include an attribute associated with the client device, such as a location of the client device, a device type of the client device, an identifier associated with the client, and the like. The attribute may then be evaluated with respect to at least one of the first policy data or the second policy data, and based at least in part on the evaluating, a provisioning service may determine that the communication connection is to be established with the first headend device. Accordingly, the provisioning service may send, to the client device, an internet protocol (IP) address that is associated with the first headend device to facilitate establishment of the communication connection.

As another example, the techniques described in this disclosure may further include receiving, at a policy service, policy data that is associated with one or more headend nodes. The one or more headend nodes may include at least a first headend node that manages a first connection to a first computing resource. Additionally, a policy query may be received from a domain name service (DNS) service. The policy query may include at least a DNS request and an attribute associated with a client node that generated the DNS request. Based at least in part on the policy data and based at least in part on the attribute, the policy service may determine that a second connection is to be established between the client node and the first headend node to provide the client node with access to the first computing resource. Accordingly, the policy service may then send, to at least one of the DNS service or the client node, an internet protocol (IP) address that corresponds to the first headend node to facilitate establishment of the second connection.

Additionally, the techniques described herein may be performed as a method and/or by a system having non-transitory computer-readable media storing computer-executable instructions that, when executed by one or more processors, performs the techniques described above.

EXAMPLE EMBODIMENTS

As discussed above, when a VPN client attempts to connect to a tunnel headend, the VPN client only needs to know a basic DNS name, for example, "vpn.company.com." However, this simple lookup is not sufficient in cloud-based VPNs since the VPN headend belongs to the cloud service provider. As such, deciding where to establish connectivity for the VPN client requires additional criteria to be evaluated, and the selection of a specific tunnel endpoint should be transparent to the end user but subject to the defined policy by the customer administrator and the constraints of the cloud service. Accordingly, described herein are improvements in technologies that, among other things, provide for policy-based connection provisioning using DNS requests.

When deciding where to establish connectivity for the VPN, various factors need to be considered by the cloud service, such as location of the VPN client, the VPN client version, a VPN client device identifier, VPN client identifier, etc. As described herein, when the DNS lookup occurs via the cloud service provider DNS server, the DNS server consults a back-end policy service. This policy service evaluates the DNS request by taking into account what it knows about the client (e.g. location, client identifier, tenant, etc.), and evaluates those attributes against one or more headend policies. The policy service knows about the available tunnel headends, as well as their characteristics and capabilities, including capacity of the data centers servicing the tunnel endpoints. Using this type of information, a policy-driven selection can be made as to which tunnel headend the VPN client is to connect. For instance, if a tunnel headend that a VPN client may traditionally connect with is at or near full capacity, the VPN client connection may be redirected to a different tunnel headend. This in turn leads to increases in efficiencies for the tunnel headends, as well as providing healthier or more appropriate connections to the VPN clients that may reduce latency or otherwise increase performance. Additionally, the amount of resources used by each of the tunnel headends may be decreased, and this also reduces the potential of overflow into other cloud services.

By way of example and not limitation, a method according to the techniques described herein may include receiving first policy data associated with a first headend device that manages one or more first connections to first computing resources. In examples, the first headend device may comprise a virtual private network (VPN) headend node, and the one or more first connections may comprise one or more VPN tunnels between the VPN headend node and the first computing resources. The method may also include receiving second policy data associated with a second headend device that manages one or more second connections to second computing resources. The second headend device may comprise another virtual private network (VPN) headend node, and the one or more second connections may comprise one or more other VPN tunnels. In some examples, the first policy data and the second policy data may be received at a provisioning service. The provisioning service may, in some examples, comprise a DNS service, a policy service, or a combination thereof. For instance, the provisioning service may comprise, or at least include, a DNS service that, in at least some instances, authenticates users who are trying to establish a VPN connection.

As used herein, the term "policy data," such as the first policy data and the second policy data described in the preceding paragraph, may include data that is indicative of a policy according to which a headend node operates (e.g., a set of rules by which the headend node must follow). For instance, policy data may indicate that a headend node policy is to only allow connections with client nodes that are located in a specific location (e.g., the United States, Western United States, Pacific Northwest region of the United States, etc.). Additionally, or alternatively, policy data that is associated with a specific policy of a headend node may indicate a specific type of the headend node, a size of the headend node, capabilities of the headend node, and so on. Additionally, or alternatively, the policy data may further indicate a capacity limitation (e.g., a maximum capacity) for a datacenter that the headend node is servicing.

In various examples, the method may include receiving, from a client device and at the provisioning service, a domain name system (DNS) lookup request to establish a communication connection with at least one of the first headend device or the second headend device in order to be able to access the one or more computing resources. The DNS request may include a basic DNS name (e.g., "vpn-.company.com"), as well as an attribute associated with the client device. The attribute may include one or more of an identifier associated with the client (e.g., a client ID), a version associated with the client, an identifier associated with the client device (e.g., a device ID), a location of the client, a tenant associated with the client, and the like. The attribute may be included within the DNS request, or may be determined by the provisioning service for the client device after receiving the DNS request from the client device.

The method may also include evaluating the attribute with respect to at least one of the first policy data or the second policy data. For example, if the attribute comprises a location associated with the client device, then the location may be evaluated with respect to a location constraint indicated in the first policy data or the second policy data to determine if a geographic location of the client device is within a threshold distance to the first headend device or the second headend device. In this way, based at least in part on the evaluating, the provisioning service may determine that the communication connection is to be established with the first headend device and send, to the client device, an internet protocol (IP) address that is associated with the first headend device to facilitate establishment of the communication connection. In some examples, one or more IP addresses that are associated with different headend devices may be sent to the client device. For instance, more than one headend device may be capable of servicing the client device to provide the connection. In this case, more than one IP address may be sent to the client device, and the client device may determine which headend device to choose based at least in part on additional parameters, such as location constraints, speed, size, etc.

In some examples, telemetry data may be received from the headend devices (e.g., the first headend device and the second headend device). The telemetry data may indicate a current capacity of the various computing resources associated with the respective headend devices, a current usage of the respective headends themselves, and/or the like. In this way, the method may include determining that a capacity of the first computing resources meets or exceeds a threshold capacity (e.g., that the first computing resources still has capacity to serve the client device), and determining that the communication connection is to be established with the first headend device may be further based at least in part on the capacity of the first computing resources. Additionally, in some examples the threshold capacity may be determined based at least in part on the attribute associated with the client device (e.g., how much capacity is required to serve the client device and/or an amount of resources that the client device is requesting).

The method may also include receiving, from the headend devices, attributes associated with the headend devices. In some examples, an attribute may indicate that the respective headend device includes a firewall, a geographic location of the headend device, or other static settings associated with the headend devices. Additionally, in at least some examples, determining that the connection should be established between a client device and a headend device may further be based at least in part on the attribute of the headend device.

In at least one example, the method may include authenticating that the client device is allowed to establish the communication connection based at least in part on the DNS request. For instance, the DNS request may include data indicating that the client device is authorized to establish the communication connection. The data may include a unique identifier associated with the client device, a user of the client device, and the like.

In some examples, evaluating the attribute with respect to the at least one of the first policy data or the second policy data may comprise sending a policy query to a tunnel policy service. For instance, the provisioning service described above may comprise a DNS service and a tunnel policy service. The DNS service may send the policy query to the tunnel policy service. The policy query may include at least the DNS request and the attribute associated with the client device. In this way, the tunnel policy service may evaluate the attribute with respect to the policies and, in at least some examples, other data (e.g., telemetry data and/or other headend attributes). Accordingly, after the tunnel policy service has evaluated the request, the tunnel policy service may send an IP address that is associated with the first headend device to the DNS service. The DNS service may then forward this IP address to the client device to facilitate establishment of the connection.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 for policy-based connection provisioning using DNS requests. The exemplary environment 100 includes various nodes and/or devices that are capable of communicating with each other, such as headend nodes 102, computing resources 104, a client node 106, a user device 108, and a provisioning service 110.

The headend nodes 102 may comprise one or more headend nodes, such as headend node 102A, 102B, and 102N (where N represents any number greater than or equal to 1). As shown, the headend nodes 102 may manage one or more connections with respective computing resources 104. For instance, headend node 102A manages a connection with computing resource 104A, headend node 102B manages a connection with computing resource 104B, and headend node 102N manages a connection with computing resource 104N. Although the connections between the headend nodes 102 and the computing resources 104 are shown as a single connection for ease of illustration, it is contemplated that each connection may comprise one or more connections. The headend nodes 102 may comprise any type of device with routing capabilities, such as a switch, router, gateway, or other network device. Additionally, the headend nodes 102 may provide connections to the computing resources 104 and/or client devices according to a predefined policy. The policy may indicate, for instance, that specific client nodes are not allowed to connect to specific computing resources, that client nodes located in a first geographic location are only allowed to connect to computing resources located in the same, first geographic location, etc.

The computing resources 104 may provide services for the client node 106. Generally, the computing resources 104 may provide basic resources such as compute (CPU), memory (RAM), storage (disk), and networking (bandwidth). Additionally, in some examples, the computing resources 104 may provide, host, or otherwise support one or more application services for client node 106 to connect to and use, such as a VPN session. The client node 106 may comprise any type of device configured to communicate using various communication protocols (e.g., IPSec, OpenVPN, SSL, TLS, DTLS, SSTP, IPEv2, and/or any other protocol) over the networks 112. For instance, the client node 106 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device In some instances, the computing resources 104 may be stored in various data centers located at different physical locations. For instance, computing resource 104A may be stored in a first data center located in a first geographic location and computing resource 104B may be stored in a second data center located in a second geographic location. The data centers may be physical facilities or buildings located across geographic areas that are designated to store networked devices. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs.

The headend nodes 102 and the computing resources 104 may be accessible to client node 106 over one or more networks 112, such as the Internet. The networks 112 may include one or more networks implemented by any viable communication technology, such as wired and/or wireless modalities and/or technologies. The networks 112 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

The provisioning service 110 may authenticate or otherwise evaluate DNS requests that are received from the client node 106. As shown in exemplary FIG. 1, the provisioning service 110 may include a DNS service 114 and a policy service 116. In this way, if the client node 106 wishes to establish a VPN connection with one of the computing resources 104, the provisioning service 110 may use the DNS service 114 and/or the policy service 116 to evaluate the DNS request to determine which computing resource (e.g., computing resource 104A, 104B, or 104N) is a "best fit" for the client node 106 to connect with. Additionally, although shown in FIG. 1 as separate entities, it is contemplated that the provisioning service 110 may perform the various functions of both the DNS service 114 and the policy service 116.

Also shown in exemplary FIG. 1 are several example steps numbered "1"-"7" to illustrate an example process of provisioning a policy-based connection using DNS. At "1," the process begins by receiving one or more headend policies 118 from a user device 108. The user device 108 may represent a system administrator and/or a client administrator who is in charge of defining the policies for each of the headend nodes 102. The headend policies 118 may be installed on each of the headend nodes 102, and each one of the headend nodes 102 may comprises a different policy. The headend policies 118 may then be stored by the policy service 116. Additionally, or alternatively, the headend policies 118 may be stored by the DNS service 114 or the provisioning service 110. Generally, the headend policies 118 may comprise a set of rules or algorithms that are evaluated against parameters for connection requests received from user devices 108 to determine what headend nodes 102 the user devices 108 are to connect.

At "2," the headend nodes 102 may send headend node data 120, such as telemetry data, headend attributes, etc. to the provisioning service 110. The headend node data 120 may be received at the provisioning service 110 and/or the policy service 116 as conditions change with respect to each of the headend nodes 102. For instance, as capacity of a headend node or computing resource decreases and/or increases, headend node data 120 may be sent to the provisioning service 110 to indicate the current capacity. In some examples, headend node data 120 may be sent according to a predefined schedule, such as every second, minute, ten minutes, etc. In this way, the provisioning service 110 can dynamically determine an accurate state for each of the headend nodes 102. The headend node data 120 may include telemetry data associated with each of the headend nodes 102 or computing resources 104 (e.g., usage, capacity, etc.). The telemetry data may comprise dynamic data that changes throughout a period of time based on various factors, such as demand and usage. Additionally, or alternatively, the headend node data 120 may include attributes associated with each of the headend nodes 102 (e.g., a location of the headend node, a type of the headend node, a size of the headend node, and the like). The attributes associated with each of the headend nodes 102 may, in some examples, comprise static data that does not frequently change over a period of time.

At "3," the client node 106 may send, via the networks 112, a DNS request 122 to the provisioning service 110. The DNS request 122 may comprise a DNS lookup request or a request to establish a VPN connection with one of the computing resources 104 via the headend nodes 102. In some examples, the DNS request may include a DNS name, as well as other client node information, such as a client identifier, device identifier, a location of the client node, a client version, etc. The DNS request 122 may, in turn, be received by the provisioning service 110 and/or the DNS service 114.

At "4," the DNS request 122 is evaluated with respect to at least one of the headend policies 118 and/or the headend node data 120 in order to identify which headend node and computing resource the client node 106 should be connected to. In some examples, evaluating the DNS request 122 may include sending the DNS request 122 and the client node information from the DNS service 114 to the policy service 116. In this way, the policy service 116 may evaluate the DNS request and client node information in view of the various headend policies 118 that are stored by the policy service 116, as well as the headend node data 120. Additionally, once the policy service 116 has finished evaluating the DNS request 122, the policy service 116 may send a headend IP address to the DNS service 114, and the DNS service 114, in turn, may forward the IP address to the client node 106 to facilitate establishment of the connection.

By way of example, and not limitation, an example policy for a headend node may require that the client node be located in the same geographic area as the headend node and that the client version be a specific version. As such, evaluating a DNS request may comprise determining that the client node is located in the same geographic area as the headend node and also determining that the client version is the specific version. In this way, if the DNS request indicates that the above policy conditions are met, then at least one of the policy service 116 or the provisioning service 110 may determine that the headend node is allowed to connect to the client node to provide the client node access to a computing resource.

At "5," at least one of the provisioning service 110 and/or the DNS service 114 may send a headend IP address 124 to the client node 106 via the networks 112 to facilitate establishment of the connection. The headend IP address 124 may only be sent after the provisioning service 110 identifies an acceptable headend node to service the client node. The headend IP address 124 may correspond to one or more of the headend nodes. For instance, in exemplary FIG. 1, the headend IP address 124 may correspond to headend node 102A.

Finally, at "6," after receiving the headend IP address 124, a connection is established between the client node 106 and the headend node 102A to facilitate the flow of traffic 126 between the client node 106 and the computing resources 104A. In some examples, the connection may comprise a VPN connection and the traffic 126 may be encrypted when it is being sent between the client node 106 and the computing resources 104A.

Figure 2B:
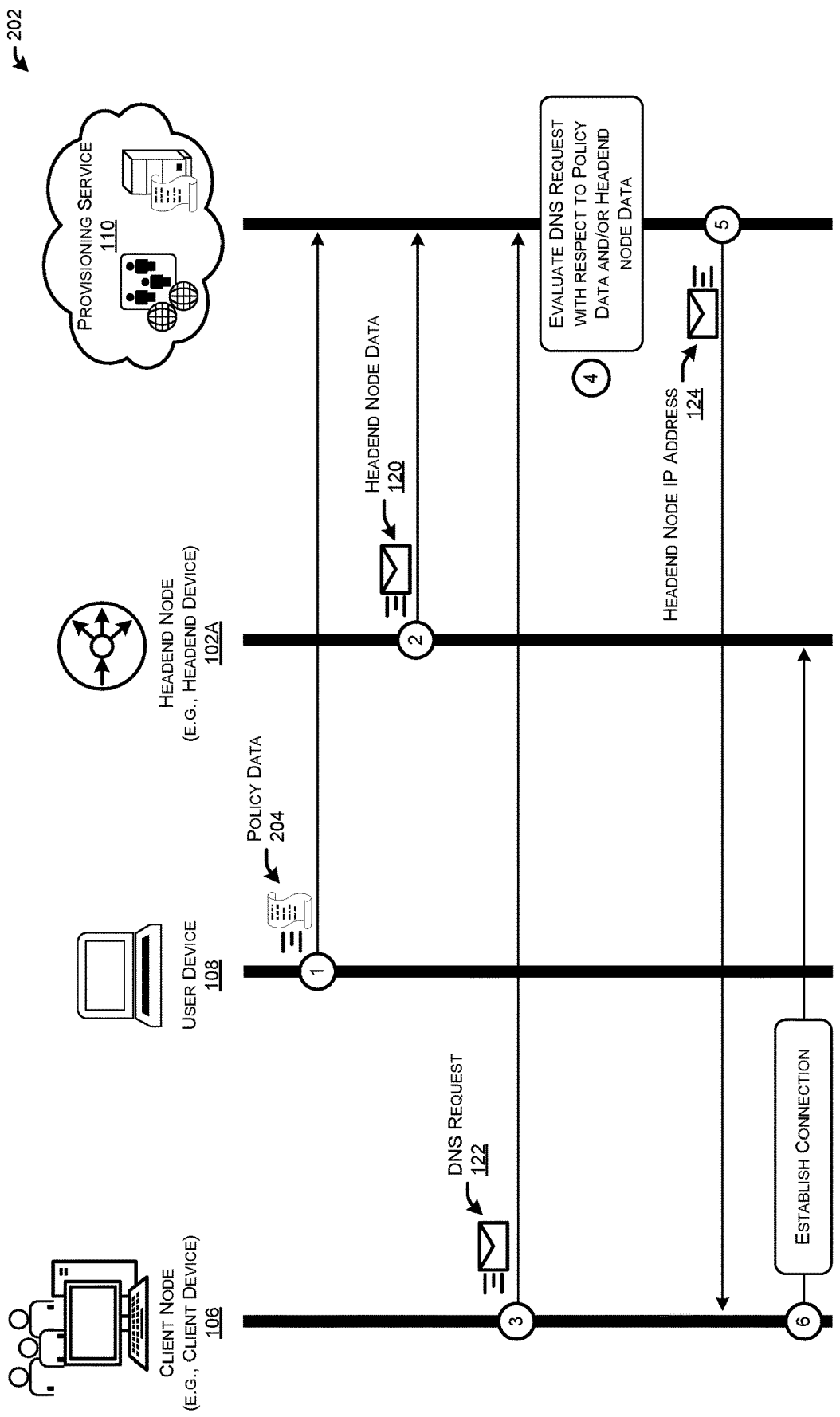

FIGS. 2A and 2B illustrate data flow diagrams of example processes 200 and 202 for policy-based connection provisioning using DNS requests. With reference to FIG. 2A, the process 200 begins at "1" where the user device 108 sends policy data 204 to the policy service 116. The policy data 204 may include one or more policies for respective ones of the one or more headend nodes, such as headend node 102A. The policy data 204 may be stored by the policy service 116 after it is received.

At "2," the process 200 may include receiving, at the policy service 116, headend node data 120 from the headend node 102A. The headend node data 120 may be received at the policy service 116 as conditions change with respect to the headend node 102A. For instance, as the capacity of headend node 102A or a computing resource decreases and/or increases, headend node data 120 may be sent to the policy service 116 to indicate the current capacity. In some examples, headend node data 120 may be sent according to a predefined schedule, such as every second, minute, ten minutes, etc. In this way, the policy service 116 can dynamically determine an accurate state for the headend node 102A. The headend node data 120 may comprise at least one of headend node attributes and/or telemetry data associated with the headend node 102A and/or a computing resource. The telemetry data may comprise dynamic data that changes throughout a period of time based on various factors, such as demand and usage. For instance, telemetry data may indicate a current usage and/or capacity of the headend node 102A and/or of a computing resource, an amount of available connections, etc. Headend node attributes may include a location of the headend node, a type of the headend node, a size of the headend node, and the like. The attributes associated with the headend node 102A may, in some examples, comprise static data that does not frequently change over a period of time.

At "3," the process 200 may include receiving a DNS request 122 at the DNS service 114 and from the client node 106. The DNS request 122 may comprise a DNS lookup request and/or a request to establish a VPN connection with a computing resource via the headend node 102A. In some examples, the DNS request 122 may include a DNS name (e.g., vpn.company.com), as well as other client node information, such as a client identifier, device identifier, a location of the client node, a client version, etc. Additionally, or alternatively, the DNS request 122 may include one or more credentials associated with the client node 106 in order to authenticate the client node 106.

At "4," the process 200 may include generating and sending a policy query 206 from the DNS service 114 to the policy service 116. The policy query 206 may include some or all of the information described above in step "5." For instance, the policy query 206 may include the DNS request 122, or at least the DNS name included in the DNS request 122. Additionally, or alternatively, the policy query 206 may include the other information associated with the client node 106, such as the client identifier, device identifier, the location of the client node 106, the client version, the one or more credentials associated with the client node 106, etc. The policy query 206 may indicate to the policy service 116 that the client node 106 is attempting to connect to headend node 102A.

Based at least in part on receiving the policy query 206, at "5," the policy service 116 evaluates the DNS request 122 that is included in the policy query 206. Evaluating the DNS request may include correlating the information associated with the client node 106 with at least one of the policy data 204 and/or the headend node data 120. For instance, if a policy of the headend node 102A includes a location constraint, a location of the client node 106 may be correlated with a location of the headend node 102A to determine if both are located in the same geographic area, or within a threshold distance of each other. As another additional or alternative example, if a policy of the headend node 102A includes a constraint that the client node 106 have a minimum client version, then evaluating the DNS request may include determining whether the client version of the client node 106 meets the minimum client version. As yet another additional or alternative example, if a policy of the headend node 102A includes a constraint that the headend node 102A or its backend computing resources do not exceed a threshold capacity, then the policy service 116 may evaluate whether establishing a connection with the client node 106 will cause the headend node 102A or the backend computing resources to exceed the threshold capacity.

At "6," based at least in part on the evaluating, the process 200 may include identifying and sending a headend node IP address 124 to the DNS service 114. The policy service 116 may identify the headend node IP address 124 based at least in part on determining that the headend node 102A will best serve the client node 106, and/or that the attributes associated with the client node 106 meet the constraints of the headend node 102A policy.

At "7," the DNS service 114 may receive the headend node IP address 124 from the policy service 116 and forward the headend node IP address 124 to the client node 106 to facilitate establishment of the connection at step "8." As shown, the connection may be established between the client node 106 and the headend node 102A. This connection may enable the client node 106 to have access to one or more backend computing resources via the headend node 102A. As an example, the client node 106 may access a VPN session that is running on the backend computing resources, and the headend node 102A may serve as a VPN tunnel headend for the VPN session.

With reference now to FIG. 2B, the process 202 begins at step "1," during which the user device 108 sends policy data 204 to the provisioning service 110. The policy data 204 may include one or more policies for respective ones of the one or more headend nodes, such as headend node 102A. The policy data 204 may be stored by the provisioning service 110 after it is received.

At "2," the process 202 may include receiving, at the provisioning service 110, headend node data 120 from at least the headend node 102A. The headend node data 120 may be received at the provisioning service 110 as conditions change with respect to the headend node 102A. For instance, as the capacity of headend node 102A or a computing resource decreases and/or increases, headend node data 120 may be sent to the provisioning service 110 to indicate the current capacity. In some examples, headend node data 120 may be sent according to a predefined schedule, such as every second, minute, ten minutes, etc. In this way, the provisioning service 110 can dynamically determine an accurate state for the headend node 102A. The headend node data 120 may comprise at least one of headend node attributes and/or telemetry data associated with the headend node 102A and/or a backend computing resource. The telemetry data may comprise dynamic data that changes throughout a period of time based on various factors, such as demand, usage, and the like. For instance, telemetry data may indicate a current usage and/or capacity of the headend node 102A and/or of a backend computing resource, an amount of available connections, etc. Headend node attributes may include a location of the headend node, a type of the headend node, a size of the headend node, and the like. The attributes associated with the headend node 102A may, in some examples, comprise static data that does not frequently change over a period of time.

At "3," the process 202 may include receiving a DNS request 122 at the provisioning service 110 and from the client node 106. The DNS request 122 may comprise a DNS lookup request and/or a request to establish a VPN connection with a backend computing resource via the headend node 102A. In some examples, the DNS request 122 may include a DNS name (e.g., vpn.company.com), as well as other client node information, such as a client identifier, device identifier, a location of the client node, a client version, etc. Additionally, or alternatively, the DNS request 122 may include one or more credentials associated with the client node 106 in order to authenticate the client node 106.

Based at least in part on receiving the DNS request 122, at "4," the provisioning service 110 evaluates the DNS request 122 with respect to at least one of the policy data 204 and/or the headend node data 120. Evaluating the DNS request 122 may include correlating the information associated with the client node 106 (that was received in the DNS request 122) with at least one of the policy data 204 and/or the headend node data 120. For instance, if a policy of the headend node 102A includes a location constraint, a location of the client node 106 may be correlated with a location of the headend node 102A to determine if both are located in the same geographic area, or within a threshold distance of each other. As another additional or alternative example, if a policy of the headend node 102A includes a constraint that the client node 106 have a minimum client version, then evaluating the DNS request may include determining whether the client version of the client node 106 meets the minimum client version. As yet another additional or alternative example, if a policy of the headend node 102A includes a constraint that the headend node 102A or its backend computing resources do not exceed a threshold capacity, then the policy service 116 may evaluate whether establishing a connection with the client node 106 will cause the headend node 102A or the backend computing resources to exceed the threshold capacity.

At "5," based at least in part on the evaluating, the process 202 may include identifying and sending a headend node IP address 124 to the client node 106. The provisioning service 110 may identify the headend node IP address 124 based at least in part on determining that the headend node 102A will best serve the client node 106, and/or that the attributes associated with the client node 106 meet the constraints of the headend node 102A policy. The provisioning service 110 may send the headend node IP address 124 to the client node 106 in order to facilitate the establishment of the connection at step "6" between the client node 106 and the headend node 102A. After this connection is established, the client node 106 may have access to one or more backend computing resources via the headend node 102A. For instance, the client node 106 may have a VPN session open on the one or more backend computing resources and the headend node 102A may act as a VPN tunnel headend.

Figure 3:
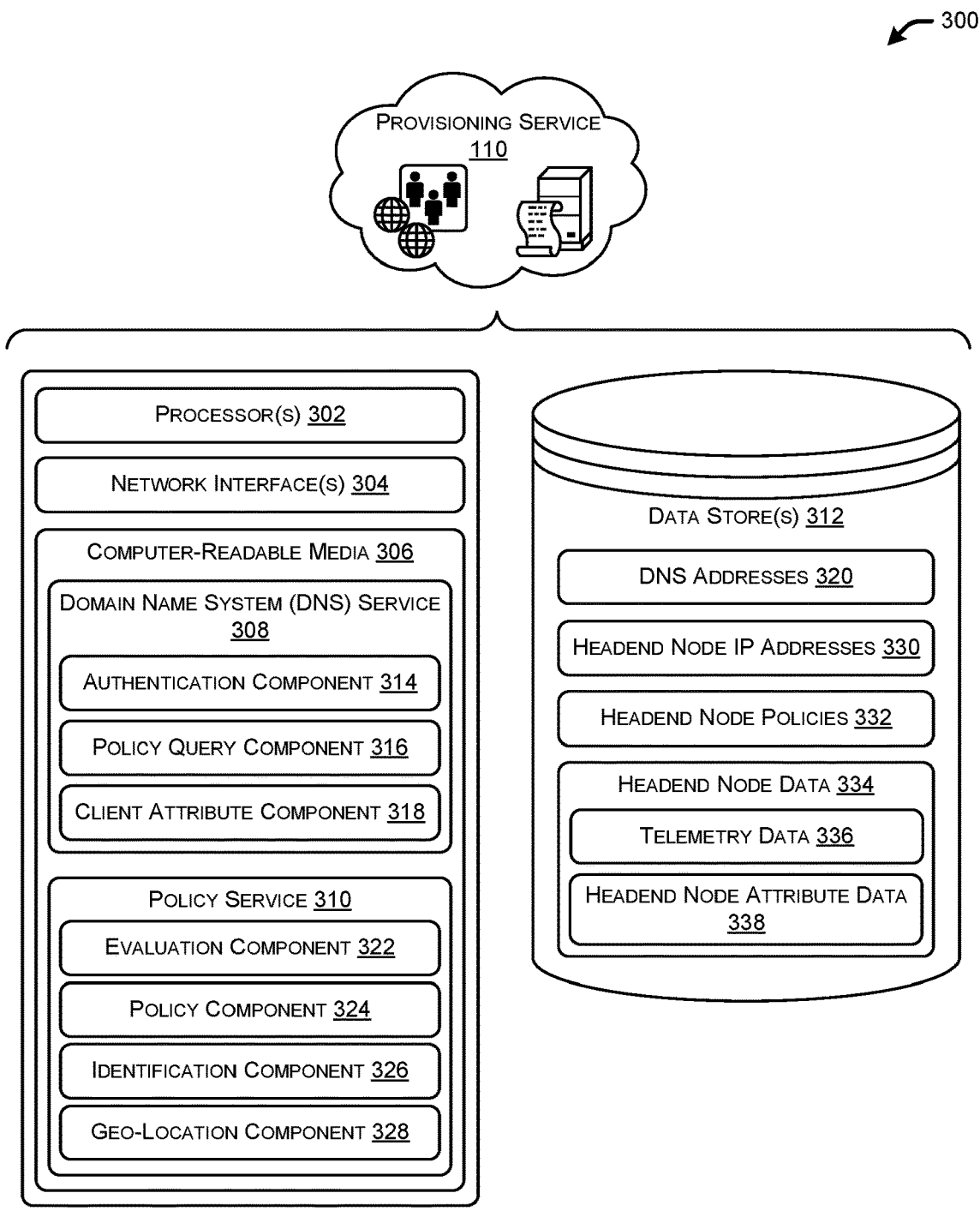
FIG. 3 illustrates a block diagram showing example detail of a provisioning service that may be used to provide policy-based connections using DNS requests.

FIG. 3 illustrates a block diagram 300 showing example components of a provisioning service 110 that may be used to provide policy-based connections using DNS requests. The provisioning service 110 may include one or more physical and/or logical components, as illustrated.

The provisioning service 110 may include one or more hardware processors 302 (processors) configured to execute one or more stored instructions. The processors 302 may comprise one or more cores. Further, the provisioning service 110 may include one or more network interfaces 304 configured to provide communications between the provisioning service 110 and other devices, such as the client node/device 106, the user device 108, the headend nodes 102, the computing resources 104, etc. The network interfaces 304 may include devices configured to couple to the network(s) 112, such as personal area networks (PANs), wired and wireless local area networks (LANs), wired and wireless wide area networks (WANs), and so forth. For example, the network interfaces 304 may include devices compatible with Ethernet, Wi-Fi™, and so forth.

The provisioning service 110 may also include computer-readable media 306 that stores various executable components (e.g., software-based components, firmware-based components, etc.). For instance, the computer-readable-media 306 may store a DNS service component 308 and a policy service component 310 that are used to establish policy-based connections to computing resources using DNS requests. The DNS service component 308 and the policy service component 310 may store various data and information within one or more data stores 312 that are accessible to the components.

The DNS service component 308 may include one or more physical and/or logical components that perform various functions, such as an authentication component 314, a policy query component 316, and a client attribute component 318. The authentication component 314 may authenticate client nodes that are attempting to establish a connection to a headend node and/or backend computing resources. In some examples, the authentication component 314 may receive DNS requests from client nodes/devices and access one or more DNS addresses 320 that are stored in the data store(s) 312 in order to authenticate the client nodes/devices.

The policy query component 316 may generate and send policy queries to the policy service on behalf of the DNS service component 308. The policy queries may be generated and sent after receiving DNS requests from the client nodes. The policy queries may include DNS addresses associated with the client node attempting to connect, as well as other information about the client node, such as location, client version, device ID, client ID, etc.

The client attribute component 318 may determine client attributes associated with the client nodes attempting to connect. For instance, the client attribute component 318 may parse and/or analyze any received DNS requests from the client nodes in order to determine a location of the client node, a client version number, a client device ID, and the like. Additionally, or alternatively, the client attribute component 318 may send requests for client node information to the client nodes in response to receiving DNS requests from the client nodes.

The policy service component 310 may include one or more physical and/or logical components that perform various functions, such as an evaluation component 322, a policy component 324, an identification component 326, and a geo-location component 328. The policy service component 310 may use some or all of these components to determine a headend node that is best fit to serve a client node that is requesting to connect.

The evaluation component 322 may evaluate incoming policy queries from the DNS service 308. The evaluation component 322 may evaluate the DNS requests and client node attributes in the policy queries with respect to at least one of headend node policies 332 and headend node data 334, including telemetry data 336 and headend node attribute data 338. The evaluation component 322 may access the data stores 312 in order to retrieve this data. For instance, in response to receiving a policy query from the DNS service 308, the evaluation component may retrieve various headend node policies 322 and headend node data 334 in order to evaluate which headend node will best service the client node. The evaluation component 322 may receive data from other components of the policy service component 310, such as the policy component 324, the identification component 326, and the geo-location component 328 in order to make the evaluation.

The policy component 324 may retrieve the headend node policies 332 from the data stores 312 in order to evaluate incoming policy queries. For instance, the policy component 324 may provide the headend node policies 332 to the evaluation component 322 in order for the evaluation component to evaluate incoming policy queries.

The identification component 326 may identify headend node IP addresses 330 that correspond to a selected headend node. For instance, the evaluation component 322 may indicate a selected headend node that will be a best fit for servicing the client node, and the identification component 326 may identify an IP address that corresponds to the headend node. In this way, the headend node IP address may be forwarded to the client node in order to facilitate establishment of the connection.

The geo-location component 328 may determine geographic locations associated with client nodes based at least in part on analyzing geo-location data that may be included in a policy query. Additionally, or alternatively, the geo-location component 328 may determine geographic locations associated with various headend nodes. Additionally, or alternatively, the geo-location component 328 may determine distances between a client node and various headend nodes that may potentially provide service to the client node.

The DNS addresses 320 may include a listing of all DNS addresses that are known by the provisioning service 110. Additionally, the DNS addresses 320 may include DNS addresses that are blocked by the provisioning service 110 or that otherwise should not be allowed to connect.

The headend node IP addresses 330 may include a listing of all IP addresses corresponding to the various headend nodes that may service the client nodes. The headend node policies 332 may include policies for each respective headend node of the various headend nodes. By way of example, and not limitation, a headend policy may indicate that a tunnel headend includes a location constraint (e.g., can only connect to client nodes in a specific geographic area), a load constraint (e.g., how many client nodes the headend node can connect to at one time), a minimum client version, and the like.

The headend node data 334 may include both telemetry data 336 and headend node attribute data 338. The telemetry data 336 may be received at the provisioning service 110 as conditions change with respect to each headend node. For instance, as the capacity of a headend node or a computing resource decreases and/or increases, telemetry data 336 may be sent to the provisioning service 110 to indicate the current capacity of the headend node and/or the computing resource. In some examples, telemetry data 336 may be received according to a predefined schedule, such as every second, minute, ten minutes, etc. In this way, the provisioning service 110 can dynamically determine an accurate state for a headend node and/or computing resource. The telemetry data 336 may comprise dynamic data that changes throughout a period of time based on various factors, such as demand, usage, and the like. For instance, telemetry data may indicate a current usage and/or capacity of a headend node and/or of a backend computing resource, an amount of available connections, etc. Headend node attribute data 338 may include a location of the headend node, a type of the headend node, a size of the headend node, existence of a firewall at or behind the headend node, and so forth. The headend node attribute data 338 may, in some examples, comprise static data that does not frequently change over a period of time.

FIGS. 4 and 5 illustrate flow diagrams of example methods 400 and 500 that illustrate aspects of the functions performed at least partly by the provisioning service 110, the DNS service 114, the policy service 116, the headend nodes 102, and/or other devices/nodes as described in FIGS. 1-3. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for providing a policy-based connection using a DNS request. The method 400 begins at operation 402, during which first policy data associated with a first headend device that manages one or more first connections to first computing resources is received. The first policy data may be received at a provisioning service, such as provisioning service 110, or at an independent policy service. Additionally, in some examples the first policy data may be received from a user device. The user device may correspond to a network administrator who defines policies for the various headend devices, or the user device may correspond to a client administrator who defines policies for client connections. Additionally, or alternatively, the first policy data may be received from the first headend device at the time that the first headend device registers with the policy service and/or the provisioning service.

At 404, the method 400 includes receiving second policy data associated with a second headend device that manages one or more second connections to second computing resources. The second policy data may be received at the provisioning service, such as provisioning service 110, or at an independent policy service. Additionally, in some examples the second policy data may be received from a user device. Additionally, or alternatively, the second policy data may be received from the second headend device at the time that the second headend device registers with the policy service and/or the provisioning service.

At 406, the method 400 includes receiving a domain name system (DNS) request to establish a communication connection between a client device and at least one of the first headend device or the second headend device, the DNS request including an attribute associated with the client device. In some examples, the DNS request may comprise a DNS lookup request that is received at the provisioning service or at the DNS service. The attribute associated with the client device may include a location of the client device, a client ID, a device ID, a client version number, and the like. The DNS request may include a DNS name, such as vpn.company.com.

At 408, the method 400 includes evaluating the attribute with respect to at least one of the first policy data or the second policy data. For instance, if the first policy data includes a location constraint, a location of the client device may be determined based at least in part on the attribute. If both the client device and the first headend device are located in the same geographic area, or within a threshold distance of each other, then the first headend device may be selected to establish the connection. As another additional or alternative example, if the first policy data of the first headend device or the second policy data of the second headend device include a constraint that the client device have a minimum client version, then evaluating the attribute may include determining whether the client version of the client device meets the minimum client version.

In some examples, the first policy data or the second policy data may additionally, or alternatively, be evaluated with respect to an attribute associated with the first headend device or the second headend device, and/or with respect to telemetry data received from the first headend device or the second headend device. Additionally, the DNS request and/ or the attribute associated with the client device may be evaluated with respect to the attribute associated with the first headend device or the second headend device, and/or with respect to the telemetry data received from the first headend device or the second headend device. In this way, for example, if the first policy data or the second policy data includes a constraint that the first headend device or the second headend device, or their backend computing resources, do not exceed a threshold capacity, then the provisioning service may evaluate whether establishing the connection with the client device will cause the first headend device or the second headend device, or their backend computing resources, to exceed the threshold capacity.

At 410, the method 400 includes determining that the communication connection is to be established with the first headend device. In various examples, determining that the communication connection is to be established with the first headend device may be based at least in part on the evaluating described above with respect to block 408. For instance, after the evaluating, it may be determined that the first headend device is more preferable to establish the connection with the client device. For instance, the first headend device may be located within a threshold distance of the client device. As an additional or alternative example, the first headend device and/or its backend computing resources may have more capacity available for allocation to the client device than the second headend device and/or its backend computing resources.

At 412, the method 400 includes sending, to the client device, an internet protocol (IP) address that is associated with the first headend device to facilitate establishment of the communication connection. Upon receiving the IP address, the client node may begin establishing the communication connection by sending packets to the IP address corresponding with the first headend device. In at least one example, sending the IP address to the client device may comprise sending a plurality of IP addresses to the client device. The plurality of IP addresses may correspond with headend devices that are deemed acceptable to establish a connection with the client device. In this way, the client device may have the opportunity to perform additional constraint filtering to identify a most preferred headend device (e.g., by choosing a headend device with the lowest cost, by choosing the closest headend device, by choosing the fastest operating headend device, and the like).

FIG. 5 illustrates a flow diagram of another example method 500 for providing a policy-based connection using a DNS request. At 502, the method 500 begins by receiving, at a policy service, policy data associated with one or more headend nodes, the one or more headend nodes including a first headend node that manages a first connection to a first computing resource. The policy service may comprise a standalone service or may be included as part of a provisioning service that also includes other components, such as a DNS service. Additionally, in some examples the policy data may be received from a user device. The user device may correspond to a network administrator who defines policies for the various headend devices, or the user device may correspond to a client administrator who defines policies for client connections. Additionally, or alternatively, the policy data may be received from the one or more headend nodes at a time when the headend nodes register with the policy service.

At 504, the method 500 includes receiving a policy query from a DNS service, the policy query including at least a DNS request and an attribute associated with a client node that generated the DNS request. The DNS request may include a basic DNS name, such as vpn.company.com.
Additionally, the attribute associated with the client node may be indicative of a location of the client node, a client identifier, a client device identifier, a version of the client node and/or device, and the like.

At 506, the method 500 includes determining, based at least in part on the policy data and based at least in part on the attribute, that a second connection is to be established between the client node and the first headend node to provide the client node with access to the first computing resource. For instance, if the policy data includes a location constraint, a location of the client node may be determined based at least in part on the attribute. If both the client node and the first headend node are located in the same geographic area, or within a threshold distance of each other, then the first headend node may be selected to establish the connection. As another additional or alternative example, if the policy data includes a constraint that the client device have a minimum client version, then evaluating the attribute may include determining whether the client version of the client node meets the minimum client version.

In some examples, the policy data may additionally, or alternatively, be evaluated with respect to attributes associated with the one or more headend nodes, and/or with respect to telemetry data received from the one or more headend nodes. Additionally, the DNS request and/or the attribute associated with the client node may be evaluated with respect to the attributes associated with the one or more headend nodes, and/or with respect to the telemetry data received from the one or more headend nodes. In this way, for example, if the policy data includes a constraint that the one or more headend nodes, or their backend computing resources, do not exceed a threshold capacity, then the policy service may evaluate whether establishing the connection with the client node will cause any of the one or more headend nodes, or their backend computing resources, to exceed the threshold capacity. As such, a headend node may be selected in which establishing the connection will not exceed the capacity of the headend node or its backend computing resources.

At 508, the method 500 includes sending, to the DNS service, an internet protocol (IP) address that corresponds to the first headend node to facilitate establishment of the second connection. Upon receiving the IP address, the DNS service may forward the IP address to the client node so that the client node can begin establishing the connection with the first headend node. In various examples, identifying the IP address that is to be sent may be based at least in part on determining that the connection is to be established with the first headend node.

Figure 6:
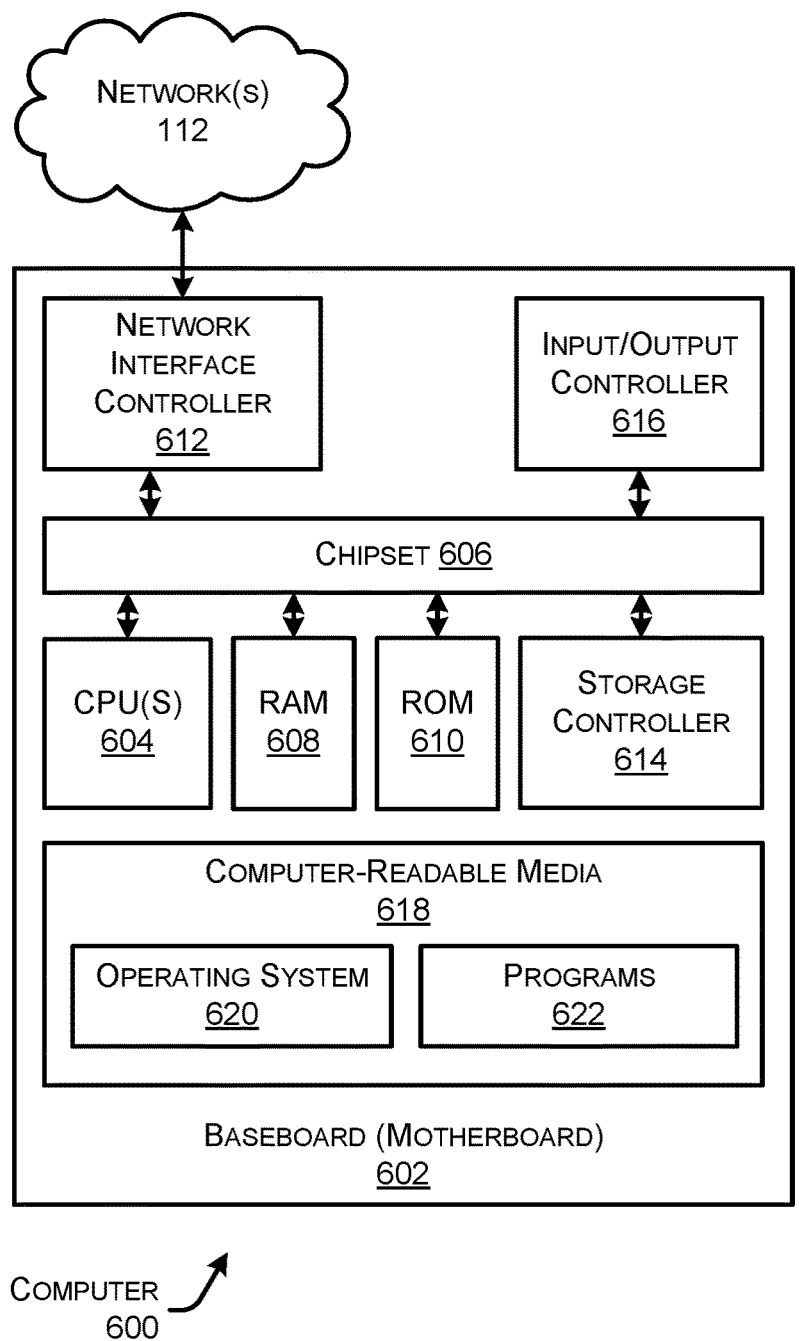
FIG. 6 is a computer architecture diagram showing an illustrative computer hardware architecture for implementing a network device that can be utilized to implement aspects of the various technologies presented herein.

FIG. 6 is a computer architecture diagram showing an illustrative computer hardware architecture for implementing a network device that can be utilized to implement aspects of the various technologies presented herein. The computer architecture shown in FIG. 6 illustrates a conventional server computer, headend node 102, computing resource 104, client node 106, user device 108, workstation, desktop computer, laptop, tablet, network appliance, e-reader, smartphone, or other computing device, and can be utilized to execute any of the software components presented herein. The computer 600 may, in some examples, correspond to a network device and may comprise networked devices such as servers, switches, routers, hubs, bridges, gateways, modems, repeaters, access points, etc.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as networks 112. The chipset 606 can include functionality for providing network connectivity through a NIC 612, such as a gigabit Ethernet adapter. The NIC 612 is capable of connecting the computer 600 to other computing devices over the networks 112. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the environment 100 and or any components included therein, may be supported by one or more devices similar to computer 600. Stated otherwise, some or all of the operations performed by the environment 100, and or any components included therein, may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a headend node 102, computing resource 104, client node/device 106, user device 108, provisioning service 110, DNS service 114, or policy service 116. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the various devices/nodes described in FIGS. 1-5. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for establishing policy-based connections using DNS requests. The programs 622 may enable the various devices and components described herein to perform various operations.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more non-transitory computer-readable media storing instructions that, when executed by the one or more processors, cause the one or more processors to perform operations comprising:
   receiving a policy query including information associated with a domain name system (DNS) request made by a client device;
   receiving first policy data for a first headend node associated with first computing resources;
   receiving second policy data for a second headend node associated with second computing resources;
   evaluating the information in view of the first policy data and the second policy data;
   based at least in part on the evaluating, selecting the first headend node for establishing a communication connection with the client device; and
   causing an internet protocol (IP) address associated with the first headend node to be sent to the client device to facilitate establishment of the communication connection.

2. The system of claim 1, wherein the system is associated with a policy service and the policy query is received from a DNS server.

3. The system of claim 1, wherein the first headend node and the second headend node are associated with a cloud service provider.

4. The system of claim 1, wherein selecting the first headend node determining comprises selecting the first headend node over the second headend node for servicing the communication connection.

5. The system of claim 1, wherein the information includes client information associated with the client device, the client information comprising one or more of a location associated with the client device, an identifier associated with the client device, or a capability associated with the client device.

6. The system of claim 1, wherein selecting the first headend node is further based at least in part on the evaluating the information in view of at least one of a characteristic or a capability associated with the first headend node.

7. The system of claim 1, wherein selecting the first headend node is further based at least in part on a capacity of a datacenter associated with the first headend node.

8. The system of claim 1, wherein the communication connection is a secure communication connection, the secure communication connection comprising at least one of a virtual private network (VPN) connection or a secure sockets layer (SSL) connection.

9. A method comprising:
   receiving a policy query including information associated with a domain name system (DNS) request made by a client device;
   receiving first policy data for a first headend node associated with first computing resources;
   receiving second policy data for a second headend node associated with second computing resources;
   evaluating the information in view of the first policy data and the second policy data;
   based at least in part on the evaluating, selecting the first headend node for establishing a communication connection with the client device; and
   causing an internet protocol (IP) address associated with the first headend node to be sent to the client device to facilitate establishment of the communication connection.

10. The method of claim 9, wherein the method is at least partially performed by a policy service associated with a cloud service provider and the policy query is received from a DNS server associated with the cloud service provider.

11. The method of claim 9, wherein the first headend node and the second headend node are associated with a cloud service provider.

12. The method of claim 9, wherein selecting the first headend node comprises selecting the first headend node over the second headend node for servicing the communication connection.

13. The method of claim 9, wherein the information includes client information associated with the client device, the client information comprising one or more of a location associated with the client device, an identifier associated with the client device, or a capability associated with the client device.

14. The method of claim 9, wherein selecting the first headend node is further based at least in part on the evaluating the information in view of at least one of a characteristic or a capability associated with the first headend node.

15. The method of claim 9, wherein selecting the first headend node that the communication connection is to be established between is further based at least in part on a capacity of a datacenter associated with the first headend node.

16. The method of claim 9, wherein the communication connection is a secure communication connection, the secure communication connection comprising at least one of a virtual private network (VPN) connection or a secure sockets layer (SSL) connection.

17. A method comprising:
   receiving, at a domain name system (DNS) server associated with a cloud service provider, a DNS request sent by a client device in association with selecting a headend node for establishing a communication connection with a resource;
   providing, by the DNS server and to a policy service, information associated with the DNS request;
   receiving, from the policy service, an indication of a selection of the headend node for servicing the communication connection, the selection based at least in part on the information; and
   sending, by the DNS server, an internet protocol (IP) address associated with the headend node to the client device to facilitate establishment of the communication connection.

18. The method of claim 17, wherein the headend node is selected from multiple headend nodes capable of servicing the communication connection.

19. The method of claim 17, wherein the communication connection is a secure communication connection, the secure communication connection comprising at least one of a virtual private network (VPN) connection or a secure sockets layer (SSL) connection.

20. The method of claim 17, wherein the policy service is associated with the cloud service provider, the policy service storing one or more policies associated with the headend node and multiple other headend nodes associated with the cloud service provider.

* * * * *